United States Patent [19]

Blaney et al.

[11] 4,297,899
[45] Nov. 3, 1981

[54] FLUID FLOW SENSOR

[75] Inventors: Peter G. Blaney, Walnut Creek; Dwain D. Conley, Clayton; Willard L. Zeigner, San Ramon, all of Calif.

[73] Assignee: Zemco, Inc., San Ramon, Calif.

[21] Appl. No.: 96,830

[22] Filed: Nov. 23, 1979

[51] Int. Cl.³ .............................................. G01F 1/22
[52] U.S. Cl. .................................................. 73/861.58
[58] Field of Search ............ 73/861.53, 861.54, 861.58

[56] References Cited

U.S. PATENT DOCUMENTS

| | | | |
|---|---|---|---|
| 2,273,331 | 2/1942 | Rowerdink | 73/861.58 |
| 2,640,356 | 6/1953 | Shannon | 73/861.54 |
| 2,654,245 | 10/1953 | Hill | 73/861.58 |
| 3,182,501 | 5/1965 | Haase | 73/861.53 |
| 3,234,790 | 2/1966 | Ekstrom | 73/861.58 |
| 4,122,863 | 10/1978 | Braukmann | 73/861.54 |

FOREIGN PATENT DOCUMENTS

| | | | |
|---|---|---|---|
| 1132769 | 3/1957 | France | 73/861.58 |
| 44-31052 | 12/1969 | Japan | 73/861.58 |

*Primary Examiner*—Herbert Goldstein
*Attorney, Agent, or Firm*—Owen, Wickersham & Erickson

[57] ABSTRACT

A compact fluid flow sensor of the variable area type is disclosed which can accurately measure a broad range of flow rates and can be installed in any position relative to the horizontal plane and which is therefore particularly adaptable for use with vehicular fuel systems. The sensor comprises connected input and output housing members that retain between them a flexible diaphragm having an annular central orifice member. An adjustable needle valve is positioned within the orifice member to form a small, variable opening for fluid. The orifice member is connected to a core member of a differential transformer whose windings are connected to a circuit producing output signal responsive to the linear position of the core member. The varying pressure differential due to fluid flow rate created on opposite sides of the diaphragm causes the orifice member, and its attached core member, to move relative to the windings and produce an output from the differential transformer proportional to the fluid flow rate.

4 Claims, 5 Drawing Figures

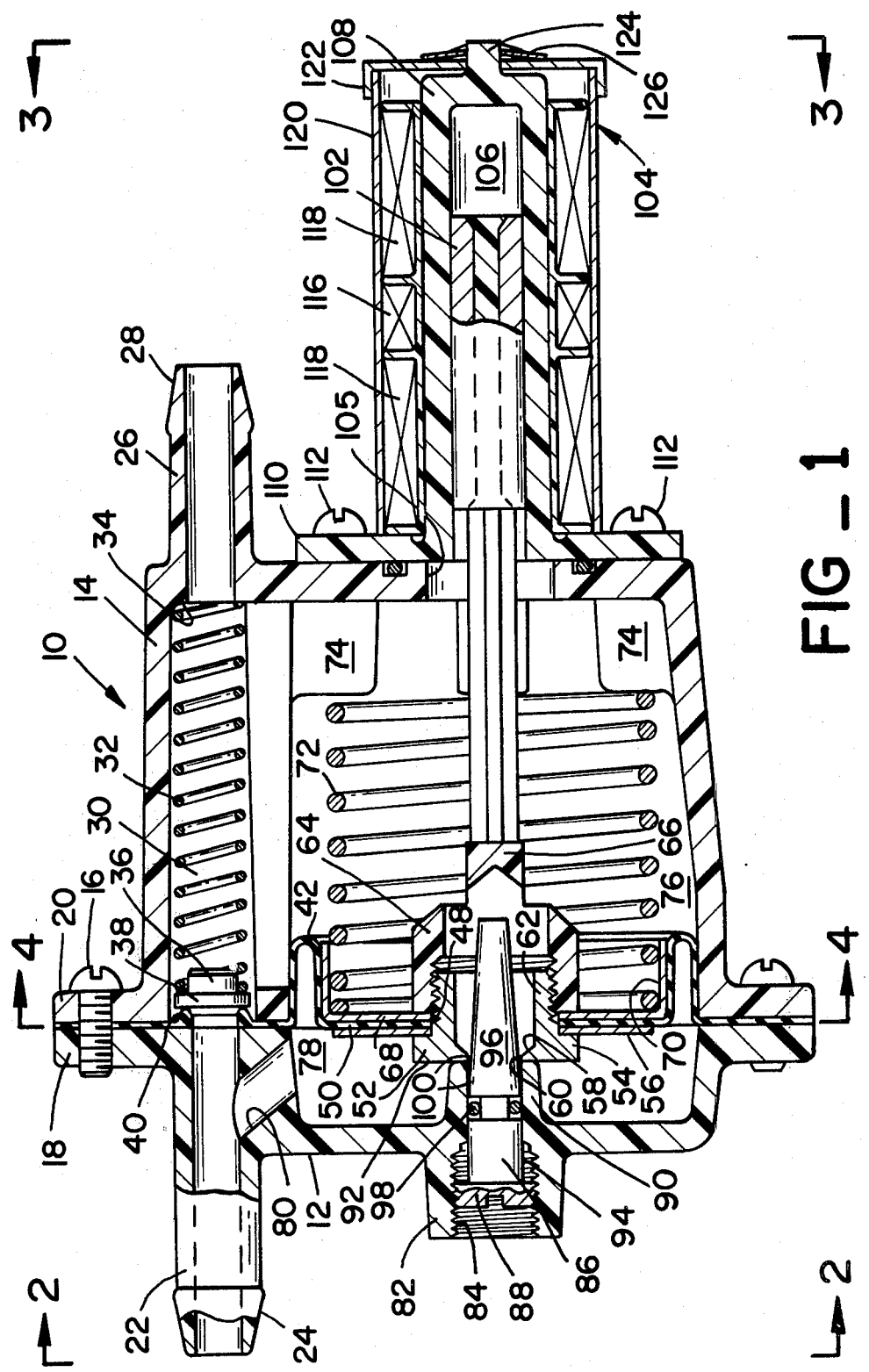
FIG_1

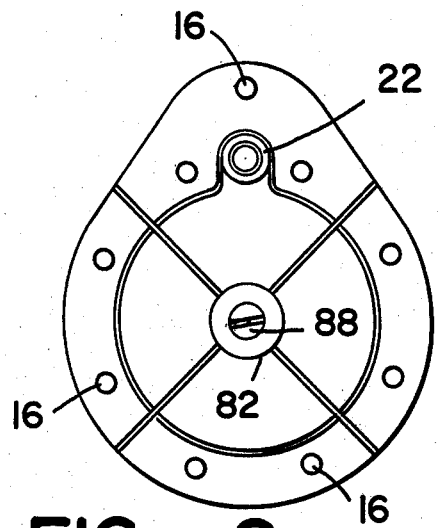
FIG_2
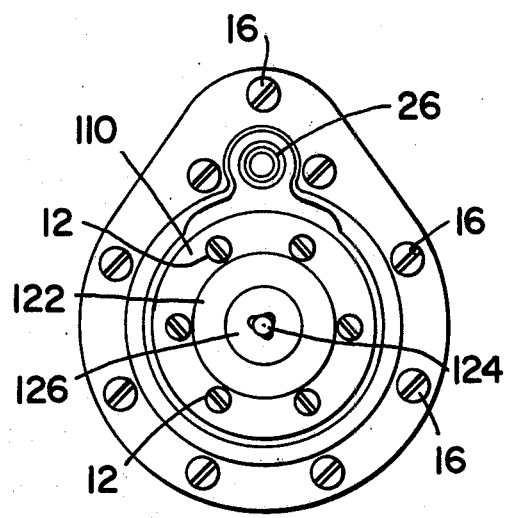
FIG_3
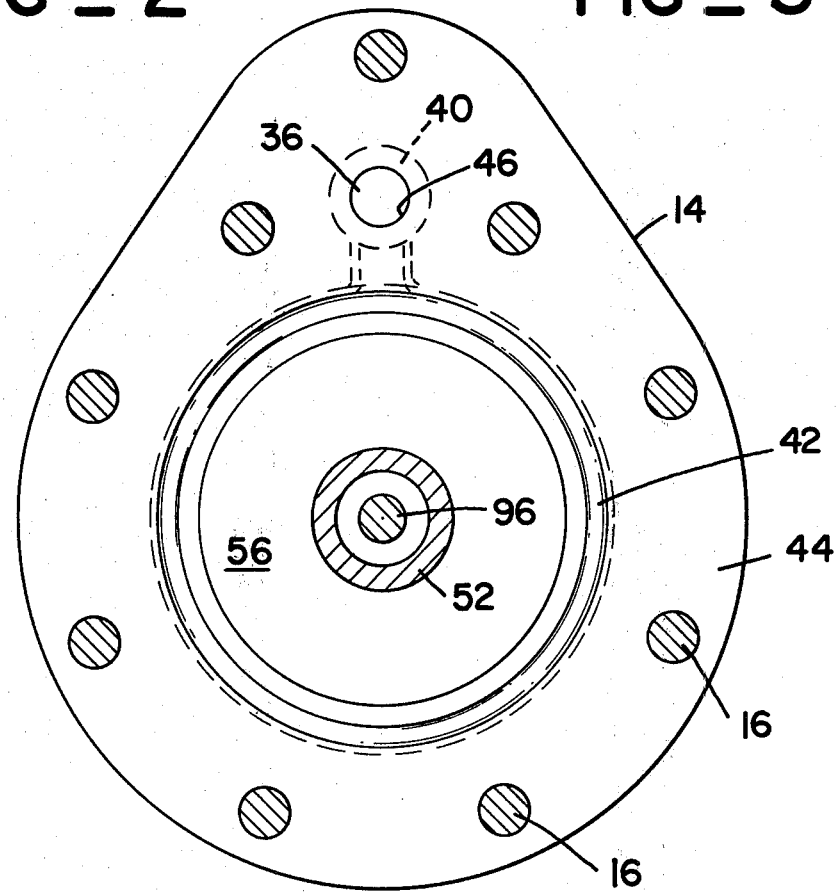
FIG_4

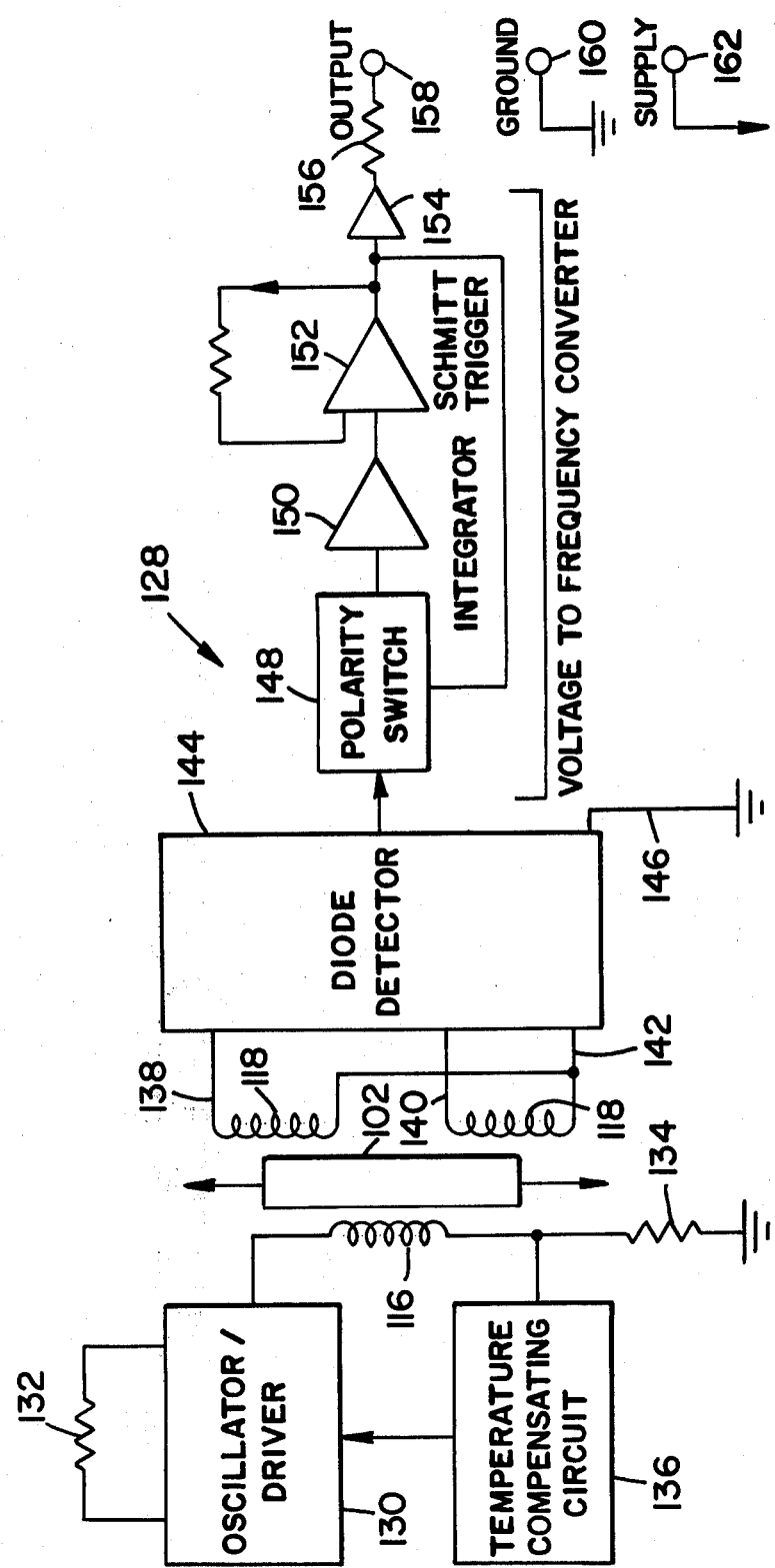
FIG_5

FLUID FLOW SENSOR

BACKGROUND OF THE INVENTION

This invention relates to a fluid flow sensor device for providing an indication of the amount of liquid flow through a conduit. More particularly, it relates to such a sensor device adaptable for use in conjunction with an automotive computer for measuring and displaying fuel consumption and related performance data.

In many types of control and measuring apparatus, it is necessary to determine with accuracy, the amount of liquid that is flowing at a given instant. Various forms of such liquid flow sensors have been suggested and developed, such as the type wherein a stream of the liquid is forced to flow through a circular path and causes a ball element to move continuously with the liquid stream around the path so that the speed of the stream and thus, its flow rate per unit time, can be measured. Such flow sensors are typified by the device disclosed in U.S. Pat. No. 3,872,304. Such rotating ball type flow sensors have inherent limitations of accuracy and reliability, particularly at low liquid flow rates. Moreover, such sensors must be mounted so that the ball track is in a horizontal plane in order to maintain its accurate operation. With crowded engine compartments in modern vehicles, this was often a difficult requirement to meet. Also, such prior flow sensors were often subject to internal liquid pressure variations or to vapor on trapped air factors. In internal combustion engines for vehicles where it is desired to measure the flow rate of fuel to determine the rate of fuel composition per distance traveled, such problems were especially serious where the flow sensor was required to measure low liquid flow rates with a relatively high degree of accuracy. The present invention solves this problem.

Another form of fluid flow meter, known as the differential pressure type, normally utilizes a movable element which, in response to variations in flow rate, causes corresponding changes in cross-sectional area of an orifice through which the fluid is flowing. Such flow meters heretofore devised, as shown typically in U.S. Pat. Nos. 4,041,758 and 3,889,535, were relatively complicated in construction, required close tolerance parts and were difficult to calibrate. Also, they were often limited to certain mounting requirements to compensate for gravity effects, or they were subject to internal friction or fluid leakage effects. The present invention provides an improved fluid flow sensor which overcomes such problems.

Another disadvantage with variable area flow sensors heretofore devised was that they were relatively complicated and therefore expensive to manufacture. For example, with such prior sensors, it was necessary to provide a specially contoured needle member for determining the size of the flow passage in combination with an orifice member in order to provide the desired accuracy. To form such a precisely contoured needle element required expensive manufacturing techniques. The present invention solves this problem by providing a flow sensor comprised of elements in combination including a needle element with an easily machined straight taper, and yet a sensor that operates with relatively high accuracy.

It is therefore a general object of the present invention to provide an improved fluid flow sensor of the variable area type that is compact, yet highly accurate, and particularly well adapted for use with a vehicular fuel monitoring system.

Another object of the invention is to provide a flow sensor comprised of components formed from the same or similar materials so that it will function with accuracy despite variations in environmental temperature.

Still another object of the present invention is to provide a fluid flow sensor that is rugged and durable and yet capable of accurate operation despite its orientation in any plane relative to the horizontal.

Yet another object of the invention is to provide a fluid flow sensor that is particularly well adapted for economy of manufacture.

SUMMARY OF THE INVENTION

In accordance with the principles of the invention, a flow sensor is comprised of a movable diaphragm located between housing elements forming inlet and outlet chambers. The diaphragm is urged toward the inlet chamber by a preloaded spring in the outlet chamber. The inlet chamber is connected to a source of liquid under pressure. The movable diaphragm has a centrally located annular orifice member, within which is an axially adjustable needle valve that forms an annular opening with the orifice, providing variable area passage between the inlet and outlet chambers. The needle valve is provided with a straight taper so that it provides a substantial range for adjustment of the sensor and is also relatively inexpensive to manufacture. The orifice member is attached to a diaphragm retainer with an elongated rod to which is attached a magnetic core member that extends within a coil assembly of a differential transformer. Movement of the diaphragm against the preloaded spring, due to fluid pressure in the inlet chamber, changes the position of the magnetic member and moves the core member relative to primary and secondary windings of the coil assembly to produce varying electrical signals proportional to the relative position of the diaphragm and rate of liquid flow.

The rate of liquid flow through the sensor is proportional to the area between the orifice and the needle valve and the square root of the pressure difference between the inlet and outlet chambers. The orifice size, the degree of needle valve taper, the diaphragm area, the spring force variation, the magnetic core size and the coil geometry, are predetermined so that the output of the differential transformer is made linearly proportional to the flow rate. In this case, both the position of the diaphragm and the output of the transformer are linearly proportional to flow rate.

The sensor is also provided with a safety bypass valve so that in the event that the orifice becomes clogged or jammed, this bypass valve will open and prevent the pressure drop across the sensor from increasing beyond a point that would establish an inadequate or inoperative flow rate for an engine or vehicle.

Other objects, advantages and features of the present invention will become apparent from the following detailed description of the embodiment presented in conjunction with the accompanying drawing.

BRIEF DESCRIPTION OF THE DRAWING

FIG. 1 is an enlarged view in side elevation and in section of a flow sensor embodying the principles of the present invention;

FIG. 2 is a front view in elevation taken along line 2—2 of FIG. 1;

FIG. 3 is a rear view in elevation taken along line 3—3 of FIG. 1;

FIG. 4 is a view in section taken along line 4—4 of FIG. 1; and

FIG. 5 is a schematic block diagram of the electrical circuitry used to provide signals from the sensor.

DETAILED DESCRIPTION OF EMBODIMENT

With reference to the drawing, FIG. 1 shows a sectional view of a liquid flow sensor 10 according to the present invention, as it appears when assembled for normal operation. In general, it comprises an inlet housing section 12 connected to an outlet housing section 14 by a series of machine screws 16 that extend through matching threaded holes in adjacent flanges 18 and 20 of these two housing sections. On the top portion of the inlet housing section is an integral tubular inlet 22 with a conical end portion 24 that facilitates its connection with a fuel line hose or the like. This inlet is axially aligned with a similarly sized tubular outlet 26 that is located on the top portion of, and is integral with, the outlet housing sections. The outlet also has a tapered end 28 that enables it to be readily attached to a conduit (not shown) extending to a liquid using device such as an engine. Both the inlet and outlet housing sections are generally pear shaped, as shown in end elevation FIGS. 2 and 3, and are preferably molded from a relatively light, but durable, plastic material. A glass filled plastic material, such as polyphelyelene sulphide, has been found to be particularly suitable because it not only has excellent molding characteristics but also provides for a relatively high service temperature.

Between the tubular inlet 22 and the aligned tubular outlet 24, is a cylindrical space 30 in the outlet housing which is occupied by a coiled bypass spring 32. One end of this spring is seated against an annular wall surface 34 surrounding the outlet passage 24. The other end of the bypass spring fits around a small annular bypass seal plug 36 and bears against an enlarged flange portion 38 of the seal plug. The spring thus normally urges the flange of the seal plug against an annular lip 40 surrounding the inlet 22 and thereby prevents any liquid from flowing through the inlet.

Situated below the bypass spring 32, within the housing section 14, is a liquid metering means that provides for the flow through of a relatively small stream of liquid. This metering means comprises a diaphragm 42 made of a flexible plastic material. This diaphragm, as shown in FIG. 4, is circular and has an outwardly extending flange portion 44 which is retained between annular transverse surfaces of the adjacent housing flanges 18 and 20. The upper flange portion has an opening 46 for the bypass passage 30 and around this opening is a thickened portion forming the sealing lip 40.

The diaphragm has a central opening 48 in a main planar annular section 50 within which is a fixed annular orifice member 52. This orifice member has a peripheral flange 54 at its inlet end that extends radially outwardly over a rigid washer 56 covering the outer side of the annular diaphragm. An inwardly extending portion 58 of this flange is tapered to form a relatively narrow edge around an opening 60. Extending axially from the peripheral flange of the orifice member and through the opening 48 in the diaphragm is an annular body portion 62 with external threads which engage similar internal threads in the head portion 64 of a diaphragm retainer 66. This retainer head portion has an end surface that bears against an annular cup washer 68 located on the inside of the diaphragm 42. This cup washer has a peripheral flange 70 around its outer edge that is spaced inwardly from the inner wall of the housing section 14.

A coiled diaphragm spring 72 extends around the head portion 64 of the diaphragm retainer and bears against the cup washer 68 at one end. At its other end, this spring bears against a series of internal shoulders 74 that extend within a chamber 76 formed by the housing section 14. This spring is preloaded so as to continually urge the diaphragm 42 and thus the orifice member 52, toward the inlet housing 12.

The inlet housing forms an inlet chamber 78 that is connected to the inlet 22 by a passage 80. On the inlet housing section is an outer boss 82 through which is a passage 84 forming a seat for an adjustable needle valve 86. This needle valve has an enlarged head end 88 with a conventional screw slot and external threads that engage internal threads within the outer boss so that the needle valve can be adjustable axially. Axially aligned with the outer boss, is an inner boss portion 90 that extends inwardly from the wall of the inlet housing section 12 and terminates at a short distance from the annular end face 92 of the orifice member 52. Integral with the head end 88 of the needle valve, is a cylindrical shank portion 94 that is integral with a tapered end portion 96. The shank and tapered portions are separated by an annular groove for an O-ring 98 that provides a seal on the inside of the inner boss portion. The tapered portion of the needle valve is preferably a straight taper and extends through the opening 60 in the orifice member formed by its inwardly directed tapered flange 58 so that a small annular passage 100 is provided around the tapered portion of the needle valve at this point. Axial adjustment of the needle valve within the boss portion will vary the area of this passage and thereby provide an adjustment for the sensor.

In order to maintain high accuracy operation of the sensor, the straight taper angle of the adjustable needle valve 86 is selected in combination with a compromise choice of spring force (i.e., pressure drop), spring rate and orifice size. It is essential to maintain the minimum error rate over the entire fluid flow range and thus over the range of spring force produced by the fluid flow. The ratio of spring force at maximum flow to spring force at minimum flow (which determines the range of diaphragm movement) is a key parameter in determining the optimum needle taper angle. When dimensions for the diaphragm area and its operating range have been selected, the aforesaid spring force ratio and orifice size are optimized to determine the minimum error with a straight tapered needle. As an example, using the described procedure, one embodiment of the flow sensor 10 according to the invention and having the following characteristics, produced a calculated accuracy of less than 2 percent, even at the low fluid flow rate:

| Diaphragm area | 10.2 cm$^2$ |
| --- | --- |
| Orifice size | 4.8 mm |
| Needle valve taper | 3° 16' |
| Spring force | .36 kg (min flow) |
| Spring force | .47 kg (max flow) |
| Flow range | .16 to 16 cc/Sec |

Integral with the head portion of the diaphragm retainer 66 is a shank portion having an elongated magnetic member 102 attached to its other end that forms the movable core of a differential transformer 104. The shank portion extends through an opening 105 in the outlet housing 14 and into a cylindrical space 106 at the center of a core guide 108. This guide has a flange 110 which is secured to the outlet housing by a series of machine screws 112. Surrounding the guide 108 is a coil assembly comprised of a spool-like device for a primary winding 116 located between a pair of secondary windings 118. The windings are covered by a sleeve-like shield 120 retained by an end shield 122. An end stud portion 124 fits through an opening in the end shield and a suitable fastener 126 is attached to the end stud to retain the shield members and the coil assembly in place. Since most of the components of the sensor, including the housings and internal washers, are formed from the same plastic material, any problems related to thermal expansion are essentially eliminated.

Under normal operation of the flow sensor, liquid flow from a supply source through the inlet 22 and the branching passage 80 into the inlet chamber 78 on one side of the diaphragm 42. With the needle valve 86 set to some preselected position, the small annular opening 100 is provided between its tapered portion 96 and the inner edge 60 of the tapered flange 58 on the orifice member, thereby allowing an initial flow of liquid into the outlet chamber 76 and thence through the outlet 26.

As the fuel flow through the sensor increases, the pressure difference between the inlet and outlet chambers increases because of the restriction creacted by the small opening 100 between the orifice and needle valve. This pressure difference forces the diaphragm 42 and orifice member 52 toward the outlet housing against the diaphragm spring 72. As the orifice moves toward the outlet housing, the small opening 100 between the orifice and needle valve increases, thus reducing the pressure drop across the orifice/diaphragm assembly. This process continues until equilibrium is established. When the diaphragm moves as described above, it also moves the attached transformer core 102, thereby increasing the output of the differential transformer 104.

As shown in the block diagram of FIG. 5, the primary and secondary windings of the linear variable differential transformer 104 are connected to a circuit 128 that may be provided on a circuit board appropriately located on the vehicle remote from the flow sensor. The primary winding 116 which is located between and overlapped by the two secondary windings 118 around the core 102 is connected at one end to an oscillator driver 130. This driver, which has a connected variable resistor 132 for adjusting the duty cycle, provides a pulsating signal to the primary winding. The other end of the primary winding is connected through a load resistor 134 to ground and also to a temperature compensating circuit 136 connected to the oscillator driver 130. The input to this temperature compensating circuit is the voltage across the load resistor and is proportional to current through the primary winding. Within the compensation circuit the input voltage is constantly compared with a reference so that if the coil current goes down, which indicates that its resistance has gone up due to a temperature rise, the input to the oscillator driver is increased.

The two spaced apart secondary windings 118 are connected by separate leads 138 and 140 at one of their ends and a common lead 142 from their opposite ends to a diode detector circuit 144 which is also connected to a common ground via a lead 146. The output of this diode detector is connected to a voltage-to-frequency converter comprised of a polarity switch 148, an integrating amplifier 150 and a Schmitt trigger comparator 156. The output from the voltage to frequency comparator is fed through a buffer amplifier 154 and a suitable series resistance 156 to an output terminal connector 158. On a circuit board for the circuit just described, a second terminal 160 is provided for the various ground connections and a third terminal 162 connected to a suitable voltage source (e.g., battery), is connected to the various power consuming components of the circuit. The alternating drive to the primary winding creates a magnetic field about it and the two secondary windings on either side.

In operation, when the transformer core 102 of the differential amplifier is moved closer to one secondary winding than the other, it couples more magnetic flux into one winding, and the output from this secondary winding, or the difference between the two secondary windings, is varied by an amount proportional to the amount of linear travel of the core. The alternating current signal from the secondary windings is converted to a direct current signal by the diode detector circuit 144. This voltage is supplied to the voltage to frequency converter and then amplified by the buffer amplifier and furnished to the output connector. This final output can then be furnished to a suitable computing microprocessor circuit for whatever use or display is desired. For example, it may be used as an input to an automotive fuel monitoring system or for various other systems where accurate fuel flow measurements are required.

The rate of fuel flow through the sensor is proportional to the area between the orifice and the needle valve and the square root of the pressure difference between the inlet and outlet chambers. By proper selection of orifice size, needle valve taper angle, diaphragm area, spring force variation, core size and coil geometry as previously described, the output of the differential transformer will be linearly proportional to flow rate. In this case, both the position of the diaphragm and the output of the transformer are linearly proportional to flow rate.

In the event the orifice 100 becomes clogged or jammed, fluid pressure against the bypass seal plug 36 will move it against the spring 32 to allow fluid to flow through the bypass chamber 30 and thereby prevent the pressure drop across the sensor from increasing beyond a preset point, such as that point in an engine fuel system which would render the engine inoperative.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

We claim:
1. A sensor device for measuring the flow rate of fluid through a conduit comprising:
an inlet housing member forming an inlet chamber and having an inlet connection to said conduit;
an outlet housing member forming an outlet chamber and attached to said inlet housing member, said inlet housing member having integral means forming an inlet passage and said outlet housing member having integral means forming an outlet passage which is axially aligned with said inlet passage;
a diaphragm assembly including flexible diaphragm means retained between said inlet and outlet cham- bers and having a central aperture, said flexible diaphragm means including an annular planar portion around said aperture, an integral circular portion with a U-shaped cross-section around the periphery of said planar portion and an outwardly extending portion integral with said circular portion, located between adjacent flange portions of said housing members, said diaphragm means also including an opening in said outwardly extending portion, said opening having an enlarged sealing lip along its edge and forming a bypass valve seat axially aligned with said inlet passage of said inlet housing;

an adjustable needle valve having a tapered body portion extending into said central aperture to form a relatively small annular opening between said inlet and outlet chambers;

spring means in said outlet housing engaging said diaphragm means and normally urging it toward said needle valve means;

elongated means fixed to and extending from said diaphragm means;

a differential transformer including a magnetic core attached to the end of said elongated means and fixed windings surrounding said core;

means for producing an output signal from said differential transformer proportional to the linear movement of said magnetic core and thus to the movement of said diaphragm and the rate of fluid flow through said small opening.

2. A sensor device for measuring the flow rate of fluid through a conduit comprising:

an inlet housing member forming an inlet chamber and having an inlet connection to said conduit;

an outlet housing member forming an outlet chamber and attached to said inlet housing member, said inlet housing member having integral means forming an inlet passage and said outlet housing member having integral means forming an outlet passage which is axially aligned with said inlet passage;

a diaphragm assembly including flexible diaphragm means retained between said inlet and outlet chambers and having a central aperture, said diaphragm assembly also including an annular orifice means within said central aperture and fixed to an enlarged head end of an elongated means fixed to and extending from said diaphragm means, said orifice means having a circular opening, and a cup washer retained by said orifice means against a central annular portion of said flexible diaphragm means;

an adjustable needle valve having a tapered body portion extending through said central opening of said orifice means and into said central aperture to form a relatively small annular opening between said inlet and outlet chambers;

spring means in said outlet housing engaging said diaphragm means and normally urging it toward said needle valve means;

a differential transformer including a magnetic core attached to the end of said elongated means and fixed windings surrounding said core;

means for producing an output signal from said differential transformer proportional to the linear movement of said magnetic core and thus to the movement of said diaphragm and the rate of fluid flow through said small opening.

3. The sensor device as described in claim 2 wherein said tapered body portion of said needle valve has a straight taper between 3 and 4 degrees with a diaphragm operating range of approximately one centimeter.

4. The sensor device as described in claim 2 wherein said inlet and outlet housings, said needle valve, and said elongated means are all made from the same glass-type plastic material.

* * * * *

UNITED STATES PATENT AND TRADEMARK OFFICE
CERTIFICATE OF CORRECTION

PATENT NO. : 4,297,899

DATED : November 3, 1981

INVENTOR(S) : PETER G. BLANEY, DWAIN D. CONLEY and WILLARD L. ZEIGNER

It is certified that error appears in the above-identified patent and that said Letters Patent are hereby corrected as shown below:

Column 1, line 33, "composition" should read --consumption--

Column 5, line 18, "flow" should read --flows--

Signed and Sealed this

Fifteenth Day of June 1982

[SEAL]

Attest:

GERALD J. MOSSINGHOFF

Attesting Officer

Commissioner of Patents and Trademarks